(12) United States Patent
Wong

(10) Patent No.: US 9,581,517 B2
(45) Date of Patent: Feb. 28, 2017

(54) REAL TIME TIRE PRESSURE GAUGE

(71) Applicant: Alex Yung Kan Wong, Vancouver (CA)

(72) Inventor: Alex Yung Kan Wong, Vancouver (CA)

( * ) Notice: Subject to any disclaimer, the term of this patent is extended or adjusted under 35 U.S.C. 154(b) by 58 days.

(21) Appl. No.: 14/804,106

(22) Filed: Jul. 20, 2015

(65) Prior Publication Data

US 2016/0016446 A1   Jan. 21, 2016

Related U.S. Application Data

(60) Provisional application No. 61/999,194, filed on Jul. 21, 2014.

(51) Int. Cl.
*B60C 23/04*   (2006.01)
*G01L 17/00*   (2006.01)
*B60C 23/02*   (2006.01)

(52) U.S. Cl.
CPC .............. *G01L 17/00* (2013.01); *B60C 23/02* (2013.01)

(58) Field of Classification Search
None
See application file for complete search history.

(56) References Cited

U.S. PATENT DOCUMENTS

| | | | |
|---|---|---|---|
| 5,629,873 A * | 5/1997 | Mittal | B60C 23/003 152/415 |
| 5,629,874 A * | 5/1997 | Mittal | B60C 23/003 152/415 |
| 5,891,277 A * | 4/1999 | Bachhuber | B60S 5/046 141/197 |
| 6,838,983 B1 | 1/2005 | Wong | |
| 2010/0147387 A1* | 6/2010 | Medley | B60C 23/003 137/1 |
| 2011/0175716 A1* | 7/2011 | Medley | B60C 23/002 340/442 |
| 2015/0116105 A1* | 4/2015 | Steiner | B60C 23/0459 340/442 |
| 2015/0336434 A1* | 11/2015 | Hammerschmidt | B60C 23/0488 340/442 |

* cited by examiner

*Primary Examiner* — Andre Allen
(74) *Attorney, Agent, or Firm* — Norton Rose Fulbright Canada

(57) ABSTRACT

A real time tire pressure gauge has a first connector for connecting to a compressed air source, a second connector for connecting to a tire valve, an internal passage between the first and second connectors, a pressure sensor configured to measure a pressure in the internal passage and generate a pressure signal indicating air pressure, a controller connected to the pressure sensor to receive the pressure signal, and a display connected to the controller. The controller is configured to store a static pressure in memory based on an initial pressure sensor and display the static pressure, detect a sudden change in pressure and store a changed pressure in memory in response to detecting the sudden change, periodically sample the pressure signal and store a periodic pressure in memory, calculate an estimated tire pressure based on the static pressure, the changed pressure the periodic pressure, and display the estimated tire pressure.

11 Claims, 3 Drawing Sheets

REAL TIME TIRE PRESSURE GAUGE

CROSS REFERENCE TO RELATED APPLICATIONS

This application claims the benefit of priority of U.S. Provisional Patent Application No. 61/999,194 filed Jul. 21, 2014, which is hereby incorporated by reference.

FIELD

The present disclosure relates generally to measuring pressure. More particularly, the present disclosure relates to apparatus and methods for measuring pressure in a tire.

BACKGROUND

Vehicle manufacturers typically provide a recommended pressure to which the vehicle's tires should be inflated for optimum performance and safety. To increase pressure in a tire, an air source must be at a pressure higher than the tire to create a pressure differential causing air to transfer from the air source to the tire. The airlines and fittings of a compressed air delivery system are typically small in cross-section relative to that of a reservoir tank of a typical compressor, and act as constrictions which create resistance to the flow of compressed air. These mechanical resistances occur in components such as lengths of small diameter pipe or hose, valves and fittings which may have mechanical constrictions or cause the air flow to abruptly change direction. The resistance causes the static pressure of the compressed air flow to drop due to frictional losses in the flow, and can lead to inaccuracies in measurement of tire pressure.

Improvements in pressure measurement devices are desirable.

SUMMARY

One aspect of the present disclosure provides a device comprising a first connector for connecting to a compressed air source, a second connector for connecting to a tire valve, an internal passage between the first and second connectors, a pressure sensor configured to measure a pressure in the internal passage and generate a pressure signal indicating air pressure, a controller connected to the pressure sensor to receive the pressure signal, and a display connected to the controller. The controller is configured to store a static pressure in memory based on an initial pressure sensor and display the static pressure, detect a sudden change in pressure and store a changed pressure in memory in response to detecting the sudden change, periodically sample the pressure signal and store a periodic pressure in memory, calculate an estimated tire pressure based on the static pressure, the changed pressure the periodic pressure, and display the estimated tire pressure.

Another aspect of the present disclosure provides a method for measuring tire pressure during inflation. The method comprises connecting a pressure measurement device to a tire valve, measuring a static pressure and storing the static pressure in a memory of the pressure measurement device, displaying the static pressure, detecting a sudden increase in pressure and storing a changed pressure in memory, displaying the changed pressure, periodically measuring the pressure and storing a periodic pressure in memory, determining an estimated inflation pressure as the static pressure plus a difference between the changed pressure and the periodic pressure, and displaying the estimated inflation pressure.

Another aspect of the present disclosure provides a method for measuring tire pressure during deflation. The method comprises connecting a pressure measurement device to a tire valve, measuring a static pressure and storing the static pressure in a memory of the pressure measurement device, displaying the static pressure, detecting a sudden decrease in pressure and storing a changed pressure in memory, displaying the changed pressure, periodically measuring the pressure and storing a periodic pressure in memory, determining an estimated deflation pressure as the static pressure minus a difference between the changed pressure and the periodic pressure, and, displaying the estimated deflation pressure.

Further aspects and details of example embodiments are set forth below.

BRIEF DESCRIPTION OF THE DRAWINGS

Embodiments of the present disclosure will now be described, by way of example only, with reference to the attached Figures.

DETAILED DESCRIPTION

Figure 1:
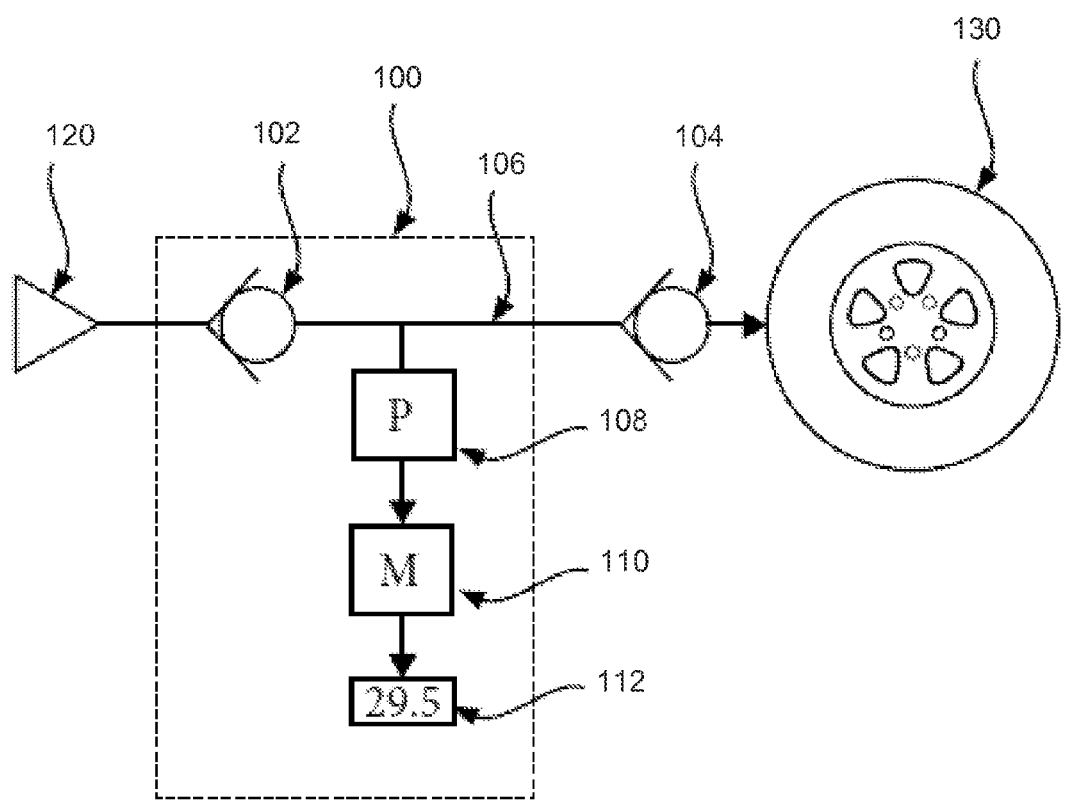
FIG. 1 is a schematic representation of a device according to one embodiment of the invention.

A schematic representation of a pressure measurement device 100 according to an example embodiment is shown in FIG. 1. The pressure measurement device 100 includes a first connector 102 for connecting to a compressed air source 120, a second connector 104 for connecting to a valve of a tire 130, an internal passage 106 between the first and second connectors 102 and 104, a pressure sensor 108 configured to measure a pressure in the internal passage and generate a pressure signal indicating air pressure, a controller 110 connected to the pressure sensor 108 to receive the pressure signal, and a display 112 connected to the controller 110. The controller 110 comprises one or more processing elements for executing computer readable instructions, and one or more memory elements for storing computer readable instructions as well as data received from the pressure sensor 108. The first connector 102 preferably comprises a check valve, which may be of the same type as the valve of the tire 130 in some embodiments. For example, the valves of the first connector 102 and the tire 130 may be Schrader-type valves, or any other type of valve commonly used on vehicle tires.

Figure 2:
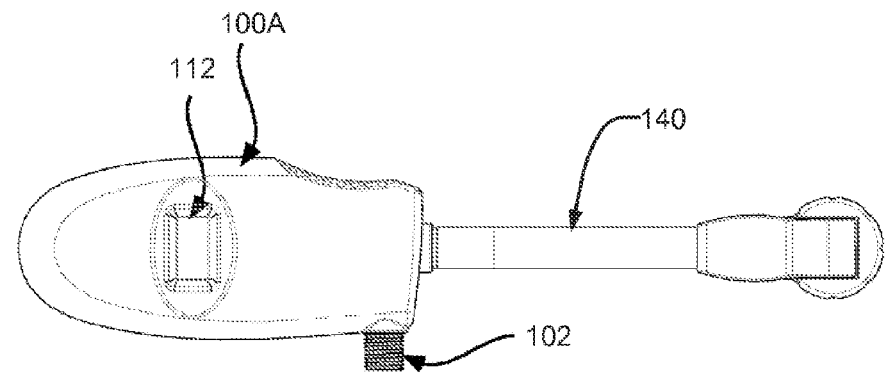
FIG. 2 shows a top plan view of an example device according to one embodiment of the invention.
Figure 3:
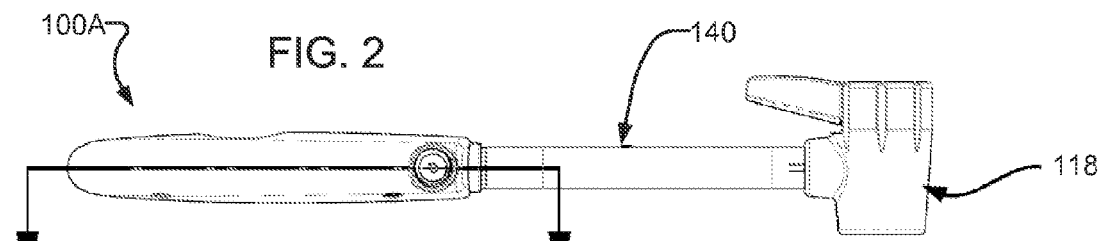
FIG. 3 shows a side view of the example device of FIG. 2.
Figure 4:
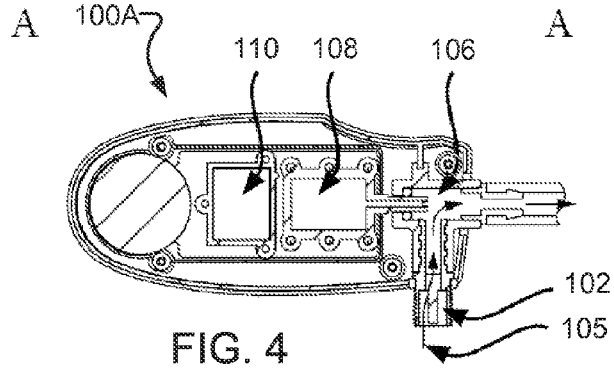
FIG. 4 is a cross sectional view taken along the line A-A of FIG. 3.

FIGS. 2-4 illustrate certain details of an example pressure measurement device 100A of the type represented in FIG. 1. The pressure measurement device 100A connects to a tire valve (not shown) by means of a clamp-on air chuck 118 (shown in FIGS. 2 and 3) which acts as the second connector 104. In other embodiments the second connector 104 may take any other form suitable for connecting to a valve of a tire. The device may also include an air hose 140 connecting the clamp-on air check 118 to the internal passage 106.

In use, the pressure measurement device 100A is connected to a tire valve by means of a clamp-on air chuck 118, at which point the internal passage 106 of the device 100A equalizes in pressure with the tire, and the static pressure of the tire is measured by pressure sensor 108 and the controller 110 causes the static pressure to be displayed on display 112. The static pressure value is stored in the device's memory as $P_1$. The controller 110 monitors the pressure sensor 108, which measures the pressure in the internal passage 106 at periodic intervals. For example, in some embodiments, the controller may be configured to sample signals from the pressure sensor 108 at a frequency in the range from about 0.5 Hz to about 10000 Hz.

When a compressed air source (not shown) is applied to the first connector 102, the pressure inside internal passage 106 will exhibit a sudden change and will increase to a changed pressure ($P_2$) between that of the compressed air source and that of the tire, and air will flow 105 through the internal passage 106 and into the tire. For example, in some embodiments a sudden change in pressure may be defined as occurring when the controller detects a pressure change of about 0.5 psi in a pre-determined time period. The pre-determined time period may, for example, be 0.1 s, 0.5 s, 1.0 s, 1.5 s, or 2.0 s in duration.

The sudden change in pressure will trigger the controller 110 to store the changed pressure as $P_2$ in memory, calculate an estimated pressure $P_{est}$ and cause the display 112 to display the estimated pressure $P_{est}$ instead of the static pressure $P_1$. As air flows 105 through internal passage 106 and into the tire, the pressure in the internal passage 106 is monitored periodically by the pressure sensor 108 and controller 110, and as long as there is no sudden change in pressure this pressure will be stored in memory as $P_{infl}$. Depending on the supply characteristics of the compressed air source and volume of the tire, $P_{infl}$ will increase at some rate as the tire pressure increases. The controller will then calculate the estimated tire pressure ($P_{est}$) based on the stored pressure values, as: $P_{est}=P_1+(P_{infl}-P_2)$.

For example, if the starting pressure in the tire $P_1=20.0$ psi, the pressure reading immediately after inflation begins is $P_2=55.0$ psi, and 5 seconds after inflation begins, $P_{infl}=57.6$ psi, $P_{est}$ will be displayed as 22.6 psi at that moment.

If the compressed air source is disconnected from the first connector 102 after a period of inflation, the pressure in the internal passage 106 will drop suddenly and will equalize with the tire pressure. The sudden change in pressure will trigger the controller 110 to stop displaying $P_{est}$ and to display the current static tire pressure reading. This pressure reading will replace the previously stored value for $P_1$, and will be updated and displayed as long as the sensed pressure does not rise or drop suddenly. If the compressed air source is subsequently applied the first connector 102, the process will begin again using the new value for $P_1$.

The device 100A is also configured to display an estimated pressure ($P_{est}$) during deflation, such as for example where pressure is relieved from the tire by opening the first connector 102 to the atmosphere. This would typically occur if the tire has been over-inflated and its pressure needs to be lowered. In this case, when the first connector 102 is opened, the pressure in internal passage 106 will drop suddenly to a lower pressure and the sudden change in pressure will trigger the controller 110 to store the value of the lower pressure as $P_2$ in memory, stop the display of the sensed pressure and to calculate and display the estimated pressure $P_{est}$, which during deflation is calculated as: $P_{est}=P_1-(P_2-P_{infl})$. As air begins to flow out of the tire and through internal passage 106, the pressure in internal passage 106 is monitored periodically by the controller 110 and, as long as there is no sudden increase in pressure, this pressure will be stored in memory as $P_{infl}$. Depending on the volume of the tire and atmospheric conditions, $P_{infl}$ will decrease at some rate as the tire pressure decreases.

For example, if the starting pressure in the tire $P=38.2$ psi, immediately after valve 3 is opened the pressure reading is $P_2=32.3$ psi, and 5 seconds after deflation begins, $P_{infl}=29.6$ psi, $P_{est}$ will be displayed as 35.5 psi at that moment.

At the point when the first connector 102 is closed, the pressure in internal passage 106 will increase suddenly and will equalize with the tire pressure. The controller 110 will be triggered to stop displaying $P_{est}$ and display the static tire pressure. This static pressure reading will then replace the previously stored value for $P_1$, and will be updated and displayed as long as the pressure reading does not rise or drop suddenly.

Figure 5:
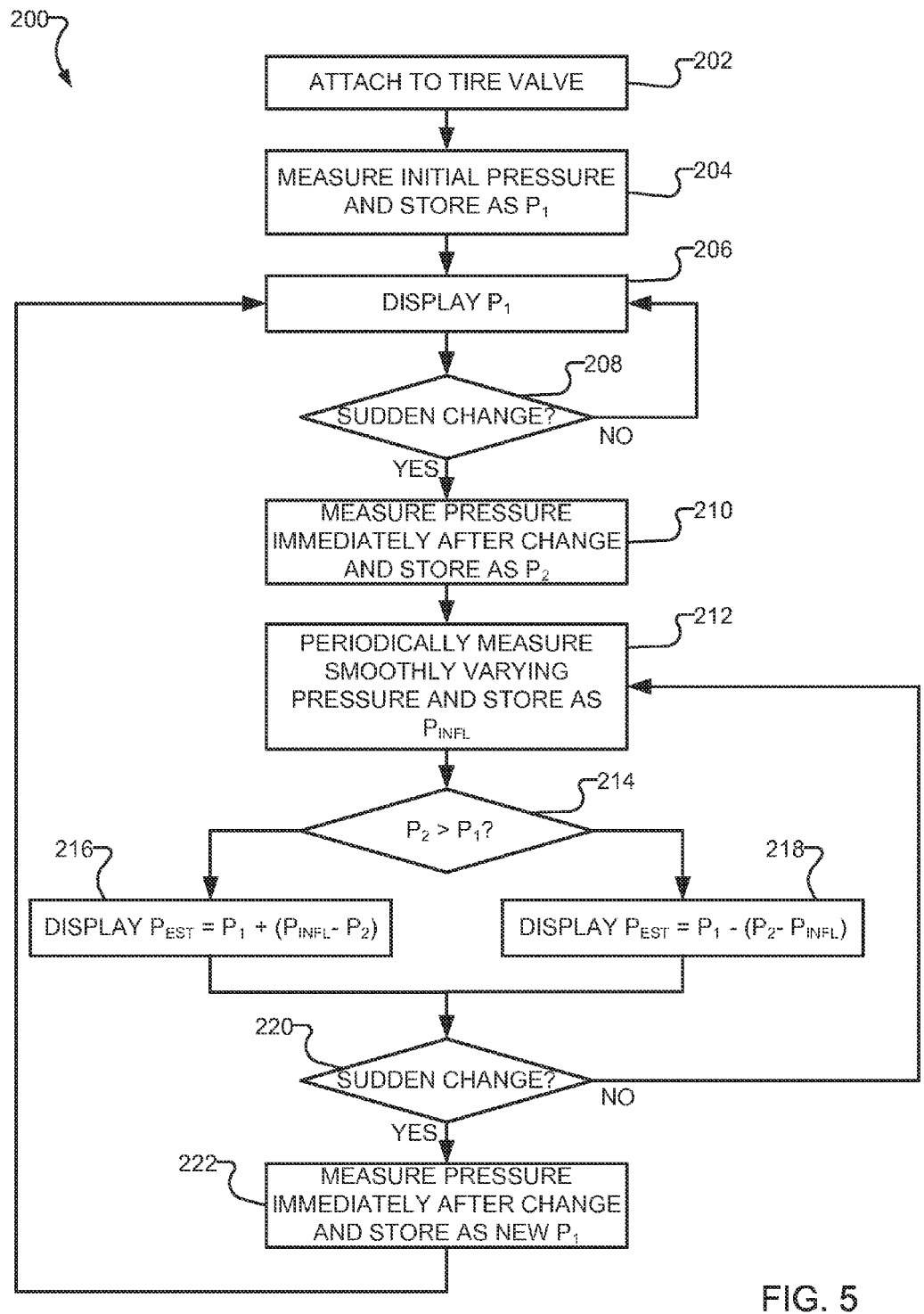
FIG. 5 is a flowchart illustrating the operation of a method according to one embodiment of the invention.

FIG. 5 is a flowchart illustrating a method 200 for inflating or deflating a tire according to one embodiment of the invention. A user attaches a pressure measurement device to a tire valve at 202, which may be a device as described above with reference to FIGS. 1 to 4. The device measures an initial static pressure and stores the static pressure in a memory of the device as $P_1$ at 204, and then displays $P_1$ at 206. The user then checks $P_1$ against a target pressure and if $P_1$ is too low, the user attaches a pump or other compressed air source to the device and inflates the tire. If $P_1$ is too high, the user relieves pressure from the tire through the device.

The device then detects a sudden change in pressure at 208 and measures the pressure immediately after the sudden change in pressure and stores the changed pressure as $P_2$ at 210. The device then continues to periodically measure the pressure and store a periodic pressure in memory as $P_{infl}$ at 212. The device determines whether the pressure is increasing or decreasing at 214. If the pressure is increasing the device calculates an estimated tire pressure $P_{est}=P_1+(P_{infl}-P_2)$ and displays the estimated pressure $P_{est}$ at 216. If the pressure is decreasing the device calculates an estimated tire pressure $P_{est}=P_1-(P_2-P_{infl})$ and displays the estimated pressure $P_{est}$ at 218. Once the user determines that the tire's pressure is equal to the target pressure, the user stops inflating the tire, or stops relieving pressure from the tire, and the device detects a sudden change in pressure at 220. The device then stops displaying the $P_{est}$ and measures the pressure immediately after the sudden change in pressure and stores the pressure as $P_1$ at 222. The device then displays $P_1$ at 206 until another sudden change in pressure is detected.

In the preceding description, for purposes of explanation, numerous details are set forth in order to provide a thorough of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

What is claimed is:

1. A device comprising:
   a first connector for connecting to a compressed air source;
   a second connector for connecting to a tire valve;
   an internal passage between the first and second connectors;
   a pressure sensor configured to measure a pressure in the internal passage and generate a pressure signal indicating air pressure;
   a controller connected to the pressure sensor to receive the pressure signal; and
   a display connected to the controller,
   wherein the controller is configured to store a static pressure in memory based on an initial pressure sensor and display the static pressure, detect a sudden change in pressure and store a changed pressure in memory in response to detecting the sudden change, periodically sample the pressure signal and store a periodic pressure in memory, calculate an estimated tire pressure based on the static pressure, the changed pressure the periodic pressure, and display the estimated tire pressure.

2. The device of claim 1 wherein the controller is configured to detect the sudden change in pressure when the pressure signal indicates a pressure change of at least 0.5 psi in a predetermined time period.

3. The device of claim 2 wherein the predetermined time period is between about 0.1 s to about 2.0 s.

4. The device of claim 1 wherein the controller is configured to periodically sample the pressure sensor at a frequency in the range from about 0.5 Hz to about 10000 Hz.

5. The device of claim 1 further comprising an air hose connecting the internal passage with the second connector.

6. A method for measuring tire pressure during inflation comprising:
   connecting a pressure measurement device to a tire valve;
   measuring a static pressure and storing the static pressure in a memory of the pressure measurement device;
   displaying the static pressure;
   detecting a sudden increase in pressure and storing a changed pressure in memory;
   displaying the changed pressure;
   periodically measuring the pressure and storing a periodic pressure in memory;
   determining an estimated inflation pressure as the static pressure plus a difference between the changed pressure and the periodic pressure; and
   displaying the estimated inflation pressure.

7. The method of claim 6 wherein detecting the sudden increase in pressure comprises detecting an increase of at least 0.5 psi in a time period of about 0.1 s to about 2.0 s.

8. The method of claim 6 wherein periodically measuring the pressure comprises sampling a pressure sensor at a frequency in the range from about 0.5 Hz to about 10000 Hz.

9. A method for measuring tire pressure during deflation comprising:
   connecting a pressure measurement device to a tire valve;
   measuring a static pressure and storing the static pressure in a memory of the pressure measurement device;
   displaying the static pressure;
   detecting a sudden decrease in pressure and storing a changed pressure in memory;
   displaying the changed pressure;
   periodically measuring the pressure and storing a periodic pressure in memory;
   determining an estimated deflation pressure as the static pressure minus a difference between the changed pressure and the periodic pressure; and
   displaying the estimated deflation pressure.

10. The method of claim 9 wherein detecting the sudden decrease in pressure comprises detecting a decrease of at least 0.5 psi in a time period of about 0.1 s to about 2.0 s.

11. The method of claim 9 wherein periodically measuring the pressure comprises sampling a pressure sensor at a frequency in the range from about 0.5 Hz to about 10000 Hz.

* * * * *